United States Patent
Shukunami et al.

(10) Patent No.: US 7,692,849 B2
(45) Date of Patent: Apr. 6, 2010

(54) METHOD FOR MEASURING NONLINEAR OPTICAL PROPERTIES, AND OPTICAL AMPLIFIER AND OPTICAL TRANSMISSION SYSTEM USING SAME

(75) Inventors: Norifumi Shukunami, Kawasaki (JP); Tatsuya Tsuzuki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 156 days.

(21) Appl. No.: 11/822,841

(22) Filed: Jul. 10, 2007

(65) Prior Publication Data

US 2008/0013162 A1 Jan. 17, 2008

(30) Foreign Application Priority Data

Jul. 13, 2006 (JP) .............................. 2006-193259

(51) Int. Cl.
*H04B 10/17* (2006.01)
*H04B 10/12* (2006.01)

(52) U.S. Cl. .................... 359/334; 359/337; 359/341.4

(58) Field of Classification Search ................. 359/334, 359/337, 341.4
See application file for complete search history.

(56) References Cited

U.S. PATENT DOCUMENTS

| | | | | | |
|---|---|---|---|---|---|
| 4,997,277 | A | * | 3/1991 | Horiguchi et al. | 356/73.1 |
| RE34,972 | E | * | 6/1995 | Horiguchi et al. | 356/73.1 |
| 5,675,428 | A | * | 10/1997 | Henmi | 398/150 |
| 5,686,986 | A | * | 11/1997 | Li et al. | 356/73.1 |
| 6,072,614 | A | * | 6/2000 | Roberts | 398/177 |
| 7,003,202 | B2 | * | 2/2006 | Tadakuma et al. | 385/122 |
| 2003/0137653 | A1 | * | 7/2003 | Kawabata | 356/73.1 |
| 2005/0058417 | A1 | * | 3/2005 | Tadakuma et al. | 385/123 |
| 2006/0029342 | A1 | * | 2/2006 | Tadakuma et al. | 385/122 |
| 2006/0146398 | A1 | | 7/2006 | Aozasa et al. | |

OTHER PUBLICATIONS

Opto-Electronic Measuring Instruments Guide for User Engineers Enlarged/Revised Edition Compiled by Toshiharu Tako and Tatushige Honda The Optronics Co., Ltd. p. 102-126.
Chinese Office Action for corresponding Chinese Application 200710136033.9; Issued Nov. 21, 2008.

* cited by examiner

*Primary Examiner*—Eric Bolda
(74) *Attorney, Agent, or Firm*—Staas & Halsey LLP (57) ABSTRACT

In an optical amplifier of the present invention, an input light is supplied to one end of an optical fiber connected to an output port, and the power of a light in an opposite direction which is input to the output port from the one end of the optical fiber, is measured, thereby obtaining a stimulated Brillouin scattering (SBS) occurrence threshold in the optical fiber based on the measurement result. Then, using the SBS occurrence threshold, a relation been the input light power and an occurrence amount of the self phase modulation (SPM) or the like in the optical fiber is obtained to be reflected on a control of the optical amplifier, so that an occurrence of the SPM or the like in the optical fiber is suppressed. As a result, it becomes possible to accurately measure, with a simple configuration, the nonlinear optical properties of the optical fiber actually connected to the output port of the optical amplifier, so that the optical S/N ratio degradation due to a nonlinear optical effect can be effectively suppressed.

12 Claims, 6 Drawing Sheets

(a) SILICA-BASED FIBER, (b) WEAK CLAD FIBER, (c) DISPERSION-SHIFTED FIBER

RELATED ART

FIG.8

RELATED ART

| TYPES OF FIBERS | | OCCURRENCE LEVEL OF NONLINEAR OPTICAL EFFECT [dBm/ch] | | FIBER PARAMETER | |
|---|---|---|---|---|---|
| | | FWM | SPM | EFFECTIVE CORE CROSS SECTIONAL AREA [$\mu m^2$] | CHROMATIC DISPERSION IN 1550nm [ps/nm/km] |
| TRANSMISSION PATH | SMF | +10 | +3 | 86 | 17 |
| | DSF | -15 | +2 | 46 | 0 |
| | NZ-DSF | +6 | +2 | 72 | 4 |
| DCF | | +5 | -6 | 14 | -100 |

FIG.9

RELATED ART

FIG.10
RELATED ART

METHOD FOR MEASURING NONLINEAR OPTICAL PROPERTIES, AND OPTICAL AMPLIFIER AND OPTICAL TRANSMISSION SYSTEM USING SAME

BACKGROUND OF THE INVENTION

1. Field of the Invention

The present invention relates to a method for measuring the nonlinear optical properties of various types of optical fibers to be used for optical communications, and an optical amplifier and an optical transmission system, each of which uses the method of measuring the nonlinear optical properties to control an optical input level to an optical fiber, thereby suppressing an occurrence of a nonlinear optical effect.

2. Description of the Related Art

In an optical transmission system, an optical amplifier is used for compensating for a transmission loss in an optical fiber or a loss in an optical function device. In a long-distance trunk system, with an increase of communication demand due to the spread of the Internet, there is introduced a wavelength division multiplexing (WDM) optical transmission system which applies the broadband property of the optical amplifier. Further, a WDM optical transmission system having a wavelength routing function is now being introduced together with the optical amplifier also in metropolitan ring networks.

As typical optical amplifiers, there are cited, for example, a rare-earth element doped optical fiber amplifier, a semiconductor optical amplifier (SOA), an optical fiber Raman amplifier and the like. Further, as rare-earth elements for the rare-earth element doped optical fiber amplifier, there are known erbium (Er) for amplifying a light in 1525-1625 nm wavelength band, thulium (Tm) for amplifying a light in 1480-1510 nm wavelength band, praseodymium (Pr) for amplifying a light in a wavelength band in the vicinity of 1300 nm and the like. At present day, in the optical transmission system, an erbium-doped optical fiber amplifier (EDFA) is mainly used.

Furthermore, the above EDFA is broadly classified into a C-band EDFA of which amplification band is in 1530-1565 nm and an L-band EDFA of which amplification band is in 1570-1605 nm. The L-band EDFA has a feature of having an erbium-doped fiber longer than that of the C-band EDFA.

As described in the above, since the C-band EDFA as well as the L-band EDFA has the amplification band of about 35 nm, for example if a plurality of signal lights contained in a WDM light is arranged at 0.8 nm (about 100 GHz) spacing, it becomes possible to collectively amplify the signal lights of 40 or more waves. Moreover, the EDFA is excellent in view of high output power, and therefore, for example the optical output power of 200 mW or more can be easily obtained. Using such characteristics, the EDFA is applied to various WDM optical transmission systems.

Figure 7:
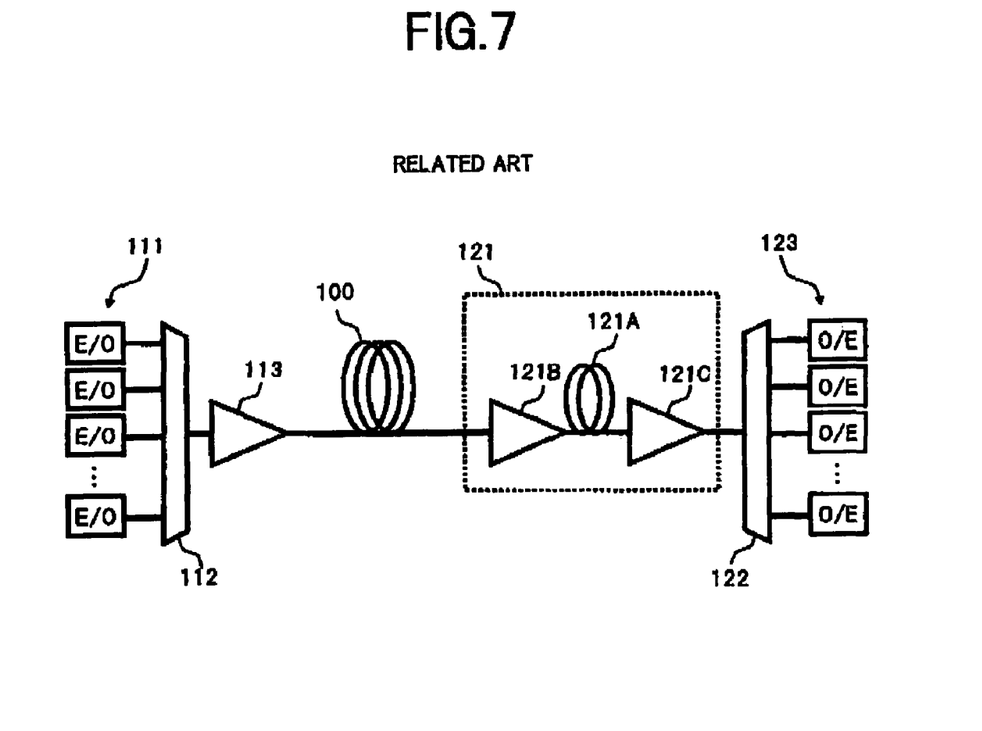
FIG. 7 is a diagram showing an example of use of an optical amplifier in a typical WDM optical transmission system.

FIG. 7 is a diagram showing an example of use of an optical amplifier in a typical WDM optical transmission system. In this WDM optical transmission system, optical signals of different wavelengths respectively output from a plurality of electric/optical (E/O) converters 111 are multiplexed by a wavelength multiplexer 112 to be input to a post-amplifier 113. In the post-amplifier 113, the input WDM light is collectively amplified to have a predetermined gain or an optical output power level, to be sent out to a transmission fiber 100. Then, the WDM light, which has been propagated through the transmission fiber 100 to be attenuated, is again amplified by a pre-amplifier 121 to have the predetermined gain or the optical output power level. The WDM light output from the pre-amplifier 121 is demultiplexed by a wavelength demultiplexer 122, and the optical signals of respective wavelengths are input to respective optical/electric (O/E) converters 123. Further, for the pre-amplifier 121, there is typically used a configuration in which a dispersion-compensating fiber (DCF) 121A for compensating for the chromatic dispersion occurred in the transmission fiber 100 is disposed, and this dispersion-compensating fiber 121A is arranged between optical amplifiers 121B and 121C of two-staged configuration.

In the WDM optical transmission system as described above, in order to improve an optical signal-to-noise (S/N) ratio, it is desirable to increase the power of the transmitted WDM light as high as possible. However, a nonlinear optical effect occurred in the transmission fiber 100 or in the dispersion-compensating fiber 121A depends on the power of the light propagated through the optical fiber, and therefore, causes the noise or the waveform distortion to degrade transmission characteristics of the WDM light. Accordingly, an upper limit of an optical input level to the optical fiber is generally restricted by the nonlinear optical effect. As the nonlinear optical effects which degrade the above transmission characteristics, there are cited the self-phase modulation (SPM), the cross phase modulation (XPM), the four-wave mixing (FWM), the stimulated Raman scattering (SRS) and the like.

Figure 8:
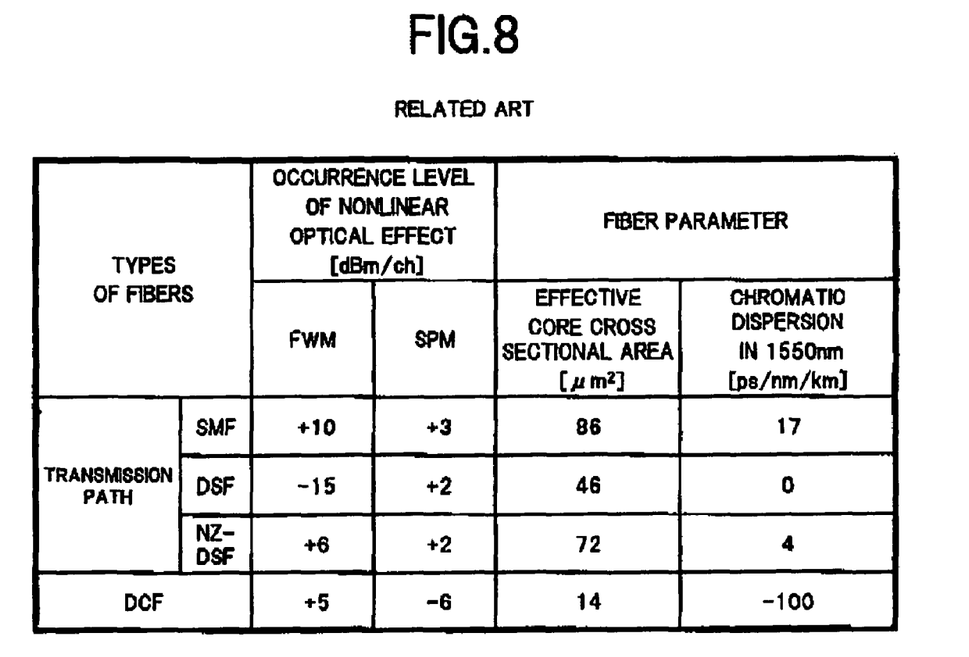
FIG. 8 is a table showing examples of optical input power levels at which nonlinear optical effects occur in optical fibers of various types.

FIG. 8 shows examples of optical input levels at which the nonlinear optical effects occur in various types of optical fibers (to be referred to as "occurrence level of the nonlinear optical effect" hereunder). Incidentally, herein, the assumption is made on the optical transmission system corresponding to the WDM light of C-band and of 10 Gb/s.

It is known that the occurrence level of the nonlinear optical effect is determined according to an optical transmission system model (for example, the wavelength band, the number of wavelengths, the wavelength spacing, a transmission distance per one span, the number of spans and the like), and also, according to types of optical fibers used for the transmission path, the dispersion compensator and the like (for example, a single mode fiber (SMF), a dispersion-shifted fiber (DSF), a non-zero dispersion-shifted fiber (NZ-DSF), a dispersion-compensating fiber (DCF) and the like) and fiber parameters (for example, an effective core cross sectional area, the chromatic dispersion, the effective fiber length and the like). As shown in the examples of FIG. 8, the optical input level to the optical fiber is generally restricted by the self-phase modulation (SPM) except for the dispersion-shifted fiber in which the chromatic dispersion in 1550 nm is 0 ps/nm/km.

In order to avoid the occurrence of the nonlinear optical effect as described above, it is necessary to restrict the optical input level to the optical fiber to be used for the transmission path and the like, that is, the optical output power level of the optical amplifier. However, in an actual operation, there are variations in fiber parameters, a connector loss, a splicing loss and the like, resulting in a problem in that an occurrence level of the nonlinear optical effect cannot be exactly grasped. In order to cope with such a problem, how the nonlinear optical properties of the optical fiber to be actually used are accurately measured to reflect the measurement result on a control of the optical amplifier becomes a major issue.

As a conventional technology related to the measurement of the nonlinear optical properties, there has been known a measuring method as disclosed in "An optical measuring device for user engineers", edited by Toshiharu TAKOU, Tatsuatsu HONDA, enlarged and revised edition, 1998, pp. 102-126. Hereunder, the description will be made on the summary of the conventional measuring method of the nonlinear optical properties.

For example, the nonlinear refractive index of a silica-based optical fiber is about $2.2 \times 10^{-20}$ m²/W. This nonlinear refractive index is relatively small compared with those of other nonlinear mediums. However, since a mold diameter thereof, which is a feature of optical fiber, is small (for example, about 10 μm) and a loss thereof is significantly small (for example, about 0.2 dB/km in 1.55 μm), it is possible to observe nonlinear optical phenomena. Most of nonlinear optical phenomena occurred in the optical fiber are caused by the nonlinear refraction. These nonlinear optical phenomena occur because the refractive index n of the optical fiber depends on the intensity P of a light as shown in the following formula (1).

$$n = n_L + n_2 P \tag{1}$$

In the above formula, $n_L$ is the linear refractive index of the optical fiber, $n_2$ is the nonlinear reactive index depending on a material for the optical fiber, and P is the input power to the optical fiber.

If the refractive index depends on the optical intensity, there occur some nonlinear optical phenomena. Most widely studied ones from among the nonlinear optical phenomena are the self phase modulation (SPM) and the cross phase modulation (XPM).

The SPM means the phase shift which is caused by the light itself when the light is being propagated through the optical fiber. A phase shift amount ϕ thereof is express by the following formula (2).

$$\phi = \frac{2\pi}{\lambda} L(n_L + n_2 P) \tag{2}$$

In the above formula (2), the term depending on the optical intensity corresponds to a phase change due to the SPM, and if this term is $\phi_{NL}$, $\phi_{NL}$ is expressed by the following formula (3).

$$\phi NL = \frac{2\pi}{\lambda} L n_2 P \tag{3}$$

In the above formula (3), L is the fiber length. However, if a proportional constant of the optical fiber in 1.55 μm is α considering the loss in the optical fiber, the effective fiber length $L_{eff}$ is expressed by the following formula (4).

$$L_{eff} = \frac{(1 - e^{-\alpha L})}{\alpha} \tag{4}$$

Further, since the optical intensity in the optical fiber is distributed in a core direction of the optical fiber, it is necessary to define an effective core cross sectional area $A_{eff}$ for a core of the optical fiber. The effective core cross sectional area $A_{eff}$ can be approximated in accordance with the following formula (5), as a function of a mode field diameter MFD of the optical fiber.

$$A_{eff} = \pi \left(\frac{MFD}{2}\right)^2 \tag{5}$$

Based on the above formulas (3), (4) and (5), a nonlinear phase change amount $\phi_{NL}^{SPM}$ due to the SPM can be expressed by the following formula (6).

$$\phi_{NL}^{SPM} = \frac{2\pi}{\lambda} \frac{L_{eff}}{A_{eff}} n_2 \cdot P \tag{6}$$

Figure 9:
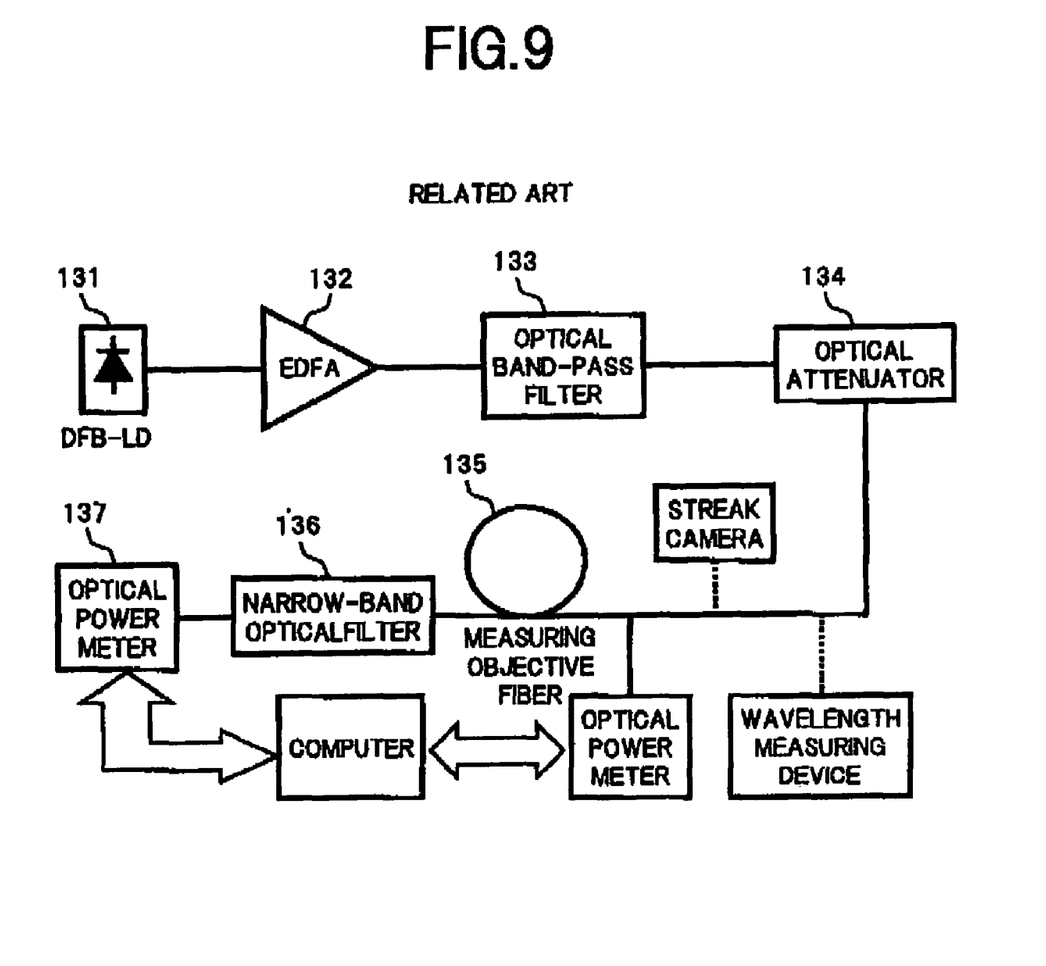
FIG. 9 is a diagram showing one example of a conventional SPM measuring system.

If the SPM is generated, a wavelength of an input light is spread and at the same time, an optical spectrum waveform thereof is also changed. One example of the conventional SPM measuring system utilizing this phenomenon is shown in FIG. 9. In this measuring system, an output light from a light source (DFB-LD) 131 is amplified by an EDFA 132, and a light from which ASE is eliminated by an optical band-pass filter 133 is input to a measuring objective optical fiber 135 via an optical attenuator 134. The optical attenuator 134 is for varying the intensity of the input light to the optical fiber 135. An output light from the optical fiber 135 passes through a 0.1 nm narrow-band optical filter 136, so that the optical intensity thereof is observed by an optical power meter 137. The measurement of the SPM is performed such that the optical power near the center of optical spectrum of which band is restricted by the narrow-band optical filter 136 is detected while the intensity of an input light pulse being changed, and a change in the optical power near the center to the peak intensity of the input light pulse is measured.

The XPM means the nonlinear phase shift which occurs in one of lights of different wavelengths when the lights of different wavelengths are simultaneously propagated in a same direction. If the optical intensity for different wavelengths $\lambda_1$ and $\lambda_2$ are $P_1$ and $P_2$, the nonlinear phase shift to $\lambda_1$ is expressed by the following formula (7).

$$\phi_{NL} = \frac{2\pi}{\lambda_1} \frac{L_{eff}}{A_{eff}} n_2 \cdot (P_1 + 2bP_2) \tag{7}$$

Two terms on the right-hand side in the formula (7) are due to the SPM and the XPM. Accordingly, the nonlinear phase change amount $\phi_{NL}^{XPM}$ due to only the XPM is expressed by the following formula (8).

$$\phi_{NL}^{XPM} = \frac{4\pi}{\lambda_1} \frac{L_{eff}}{A_{eff}} n_2 b P_2 \tag{8}$$

In the above formula, b is a coefficient depending on polarization states of the wavelengths $\lambda_1$ and $\lambda_2$, and in the case where the input light is not polarized, b has a value of b=⅔.

Figure 10:
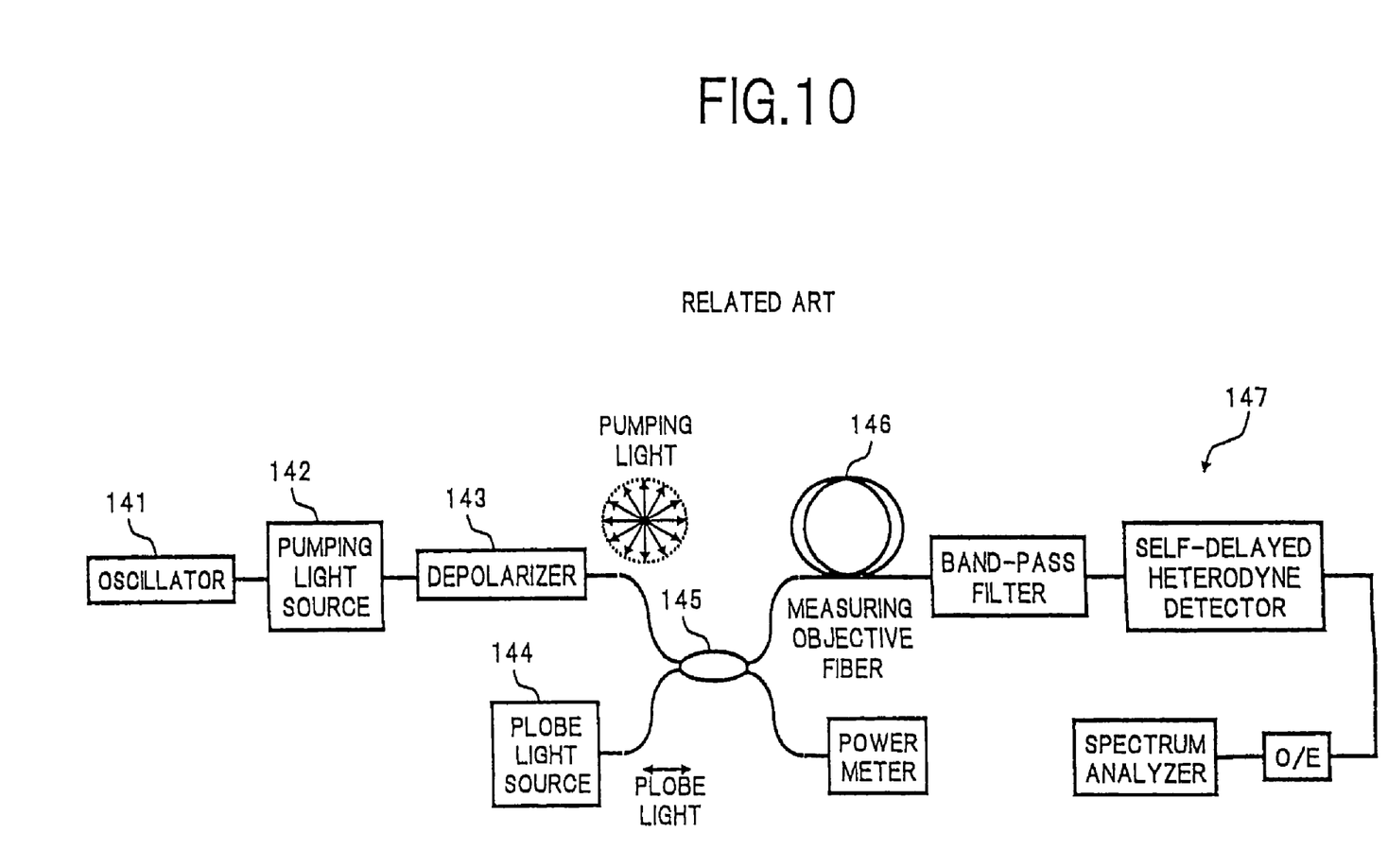
FIG. 10 is a diagram showing one example of a conventional XPM measuring system.

One example of a conventional XPM measuring system is shown in FIG. 10. In this measuring system, a pumping light output from a pumping light source 142 which is intensity modulated in accordance with an output signal from an oscillator 141, is depolarized by a depolarizer 143, and this pumping light and a probe light output from a probe light source 144 are coupled by an optical coupler 145 to be supplied to a measuring objective fiber 146, so that the probe light is subjected to the phase modulation through the XPM. A frequency component generated by this phase modulation is received by a self-delayed heterodyne reception system 147, so that a phase shift amount of the probe light can be obtained.

Each of the SPM and the XPM described above is an elastic nonlinear optical phenomenon in which energy is not reciprocated between an electro-magnetic field and the optical fiber. Contrary to this, the stimulated Raman scattering (SRS) and the stimulated Brillouin scattering (SBS) are called stimulated inelastic scattering, since an optical energy as the electro-magnetic field excites an oscillation mode of silica glass to move to the optical fiber medium. A main difference between the SRS and the SBS is in that phonons in optical mode contribute in the SRS, whereas phonons in acoustic mode contribute in the SBS. Each of the SRS and the SBS is a phenomenon in which, when a light of high energy is incident on the optical fiber, a light of different wavelength (Stokes wave) is generated on a longer wavelength (low energy) side of the incident light. Due to a difference between the optical mode and the acoustic mode, the Stokes wave is generated mainly in a forward direction in the SRS, while being generated only in a backward direction in the SBS. A Raman gain spectrum in the silica-based fiber is very broad at about 30 THz, and a frequency shift amount of the Stokes wave is approximately 13 THz. Contrary to this, the Brillouin gain spectral width is very narrow at about 10 MHz, and the frequency shift amount of the Stokes wave is approximately 10 GHz which is smaller than that in the SRS.

On feature common to the SRS and the SBS is in that the SRS and the SBS show the behaviors as if they have thresholds. Namely, only when the optical intensity exceeds a certain threshold, energy conversion into the Stokes wave becomes significant A threshold $P_{SRS}^{th}$ of the SRS occurrence is expressed by the following formula (9).

$$P_{SRS}^{th} = 16 \frac{A_{eff}}{L_{eff}} \cdot \frac{1}{g_R} \tag{9}$$

In the above formula (9), $g_R$ is a Raman gain coefficient and has a value of $g_R \cong 1 \times 10^{-13}$ m/W in the case of the silica-based fiber. Further, a constant 16 on the right-hand side is a value in the case of forward pumping, and has a value of 20 in the case of backward pumping. A pumping wavelength for obtaining the Stokes wave of 1.55 μm band is 1.45 μm band taking the frequency shift of 13 THz into consideration. The effective fiber length $L_{eff}$ is $L_{eff}$=13 km in accordance with the relation of the above formula (4), provided that, for example, the optical fiber length L=20 km, and α=0.2 dB/km in 1.45 μm band and 1.55 μm band. The effective core cross sectional area $A_{eff}$ is $A_{eff}$=20 μm², provided that, for example, the mode field diameter of the optical fiber is MFD=5 μm. The threshold $P_{SRS}^{th}$ of the SRS occurrence in this case is 240 mW in the forward pumping while being 300 mW in the backward pumping, and accordingly, the significantly high optical intensity is needed.

Further, a threshold $P_{SBS}^{th}$ of the SBS occurrence is expressed by the following formula (10), similarly to the above formula (9).

$$P_{SBS}^{th} = 21 \frac{A_{eff}}{L_{eff}} \cdot \frac{1}{g_B} \tag{10}$$

In the above formula (10), a constant 21 on the right-hand side is a value determined according to the line width of a Brillouin gain, which is an approximation. Further, $g_B$ is a Brillouin gain coefficient and has a value of $g_B \cong 5 \times 10^{-11}$ m/W in the case of the silica-based fiber. The ($1/g_B$) item is smaller than ($1/g_R$) in the case of the SRS by two digits. The threshold $P_{SBS}^{th}$ of the SBS occurrence is 0.6 mW for when the effective fiber length $L_{eff}$=13 km and the effective core cross sectional area $A_{eff}$=20 μm², so that the SBS can be observed as a scattered light in the backward direction with the optical intensity lower than that in the SRS.

Further, the above formula (10) can be expressed by the following formula (11) taking the line width $\Delta v_s$ of the light source and the Brillouin gain line width $\Delta v_b$ into consideration.

$$P_{SBS}^{th} = 21 \frac{A_{eff}}{L_{eff}} \cdot \frac{1}{g_B} \cdot \frac{\Delta v_b + \Delta v_s}{\Delta v_b} \tag{11}$$

In the above formula, the line width $\Delta v_b$ of the light source is about several MHz in the DFB-LD typically used as a light source in the WDM optical transmission system. Further, the Brillouin gain line width $\Delta v_b$ has a value of about 100 MHz in a wavelength of 1.55 μm.

However, in the above described conventional measuring technology of the nonlinear optical properties, the significantly complicated measuring system as shown in FIG. 9 or FIG. 10 is needed. If such a measuring system is incorporated into a WDM optical transmission system using an optical amplifier as shown in FIG. 7 so as to grasp an occurrence state of the nonlinear optical effect in a transmission fiber or a dispersion-compensating fiber, and according to the occurrence state, the optical amplifier is controlled, thereby trying to suppress the degradation of the optical S/N ratio due to the nonlinear optical effect, there is caused a problem in that a configuration of the overall system becomes complicated to lead the rise of cost.

SUMMARY OF THE INVENTION

The present invention has been accomplished in view of the above problems, and has an object to provide a method for accurately measuring, with a simple configuration, the nonlinear optical properties of an optical fiber which is actually connected to an output port of an optical amplifier. Further, the present invention also has an object to provide an optical amplifier and an optical transmission system, each of which uses the measuring method of the nonlinear optical properties to control an optical input level to the optical fiber, thereby suppressing an occurrence of a nonlinear optical effect.

In order to achieve the above object, a measuring method of the nonlinear optical properties according to the present invention, for measuring the nonlinear optical properties in an optical fiber connected to an output port of an optical amplifier, comprises: supplying an input light to one end of the optical fiber from the optical amplifier; measuring the power of a light propagated in an opposite direction which is input to the output port of the optical amplifier from the one end of the optical fiber corresponding to the input light, to judge whether or not the stimulated Brillouin scattering occurs; obtaining a threshold of the input light power, at which the stimulated Brillouin scattering occurs in the optical fiber, based on the power of the input light and the judgment result; and using the threshold, obtaining a relation between the input light power and an occurrence amount of a nonlinear optical effect which is different from the stimulated Brillouin scattering, in the optical fiber.

Further, in the above measuring method of the nonlinear optical properties, using the threshold, a relation between the input light power and a phase change amount due to the self-phase modulation or the cross-phase modulation in the optical fiber may be obtained, or a relation between the pumping light power and a Raman amplification gain factor due to the stimulated Raman scattering in the optical fiber may be obtained.

One aspect of an optical amplifier according to the present invention provided with: an input port to which an optical signal is input; an output port to which an optical fiber is connected; an optical amplifying section disposed on an optical path between the input port and the output port; and a control section that controls the optical amplifying section, comprises: a test light supply section that supplies, to the optical amplifying section, a test light corresponding to a wavelength of the optical signal input to the input port; an optical power measuring section that supplies the test light amplified by the optical amplifying section to one end of the optical fiber from the output port, and measures the power of a light propagated in an opposite direction which is input to the output port from the one end of the optical fiber corresponding to the input light, to judge whether or not the stimulated Brillouin scattering occurs; and a computing section that obtains a threshold of the input light power, at which the stimulated Brillouin scattering occurs in the optical fiber, based on the input light power and the judgment result in the optical power measuring section, and using the threshold, obtains a relation between the input light power and an occurrence amount of a nonlinear optical effect which is different from the stimulated Brillouin scattering, in the optical fiber, wherein the control section controls an amplifying operation of the optical signal in the optical amplifying section, based on the relation obtained by the computing section, to suppress an occurrence of the nonlinear optical effect in the optical fiber.

In the optical amplifier as described in the above, the test light from the test light supply section is amplified by the optical amplifying section to be input to the one end of the optical fiber from the output port. In the optical fiber, if the power of the input light is increased, the light propagated in the opposite direction to the input light is generated due to Me stimulated Brillouin scattering (SBS), and therefore, the power of the light propagated in the opposite direction, which is input to the output port of the optical amplifier from the one end of the optical fiber corresponding to the input light to the optical fiber, is measured, so that the threshold of the input light power, at which the SBS occurs in the optical fiber, is obtained. Since the threshold of the SBS occurrence is represented as a function using the effective fiber length $L_{eff}$ of the optical fiber and an effective cross sectional area $A_{eff}$ thereof, the relation been the input light power and another nonlinear optical effect using $L_{eff}$ and $A_{eff}$ as parameters thereof can be indirectly obtained using the threshold of the SBS occurrence, and such a relation is reflected on the control of the optical amplifying section, thereby enabling the suppression of the occurrence of the nonlinear optical effect in the optical fiber.

According to the measuring method of the nonlinear optical properties in the present invention as described in the above, differently from a conventional measuring method, a significantly complicated measuring system is not needed, and therefore, the nonlinear optical properties of the optical fiber connected to the output port of the optical amplifier can be accurately measured with a simple configuration. Further, according to the optical amplifier in the present invention, based on the result by the above measuring method, the amplifying operation of the optical signal in the optical amplifying section is controlled, and therefore, it becomes possible to effectively suppress the degradation of an optical S/N ratio due to the nonlinear optical effect in the optical fiber.

Other objects, features and advantages of the present invention will become apparent from the following explanation of Me embodiments, in conjunction with the appended drawings.

DESCRIPTION OF THE PREFERRED EMBODIMENTS

There will be described embodiments for implementing the present invention, with reference to the accompanying drawings. The same reference numerals denote the same or equivalent parts in all drawings.

Figure 1:
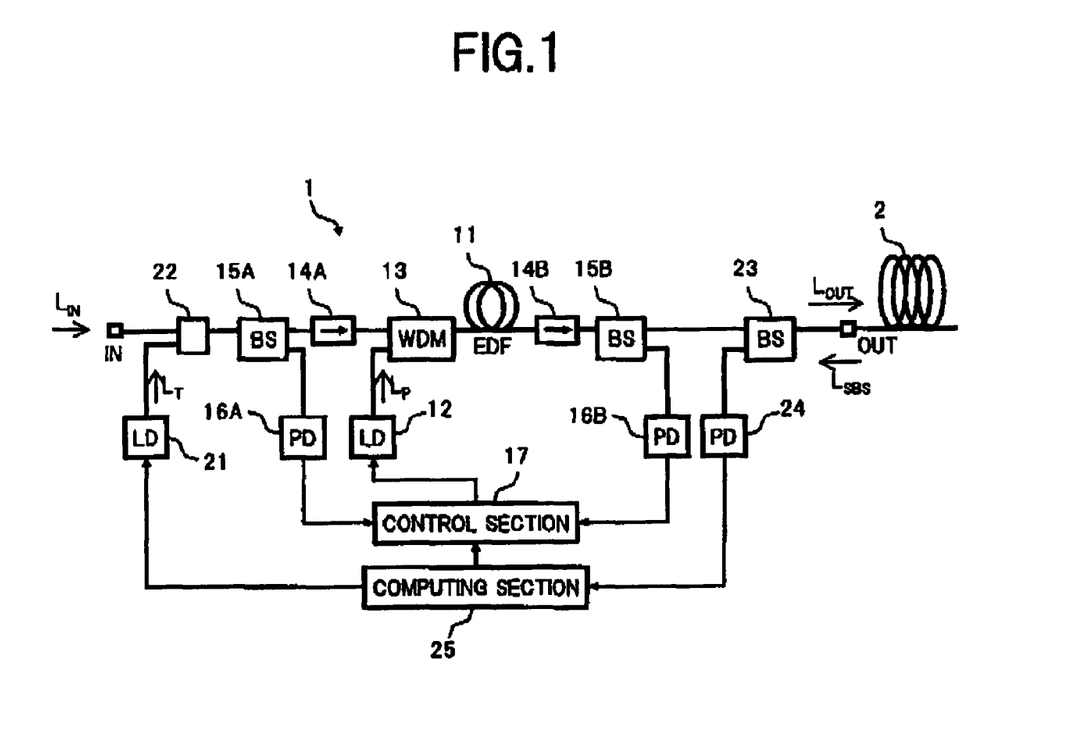
FIG. 1 is a block diagram showing a configuration of one embodiment of an optical amplifier using a measuring method of the nonlinear optical properties according to the present invention.

FIG. 1 is a block diagram showing a configuration of one embodiment of an optical amplifier using a measuring method of the nonlinear optical properties according to the present invention.

In FIG. 1, an optical amplifier 1 in the present embodiment is arranged with, for example, an erbium-doped fiber (EDF) 11 on an optical path between an input port IN and an output port OUT, and supplies a pumping light Lp output from a pumping light source 12 to the erbium-doped fiber 11 via a WDM coupler 13 from a signal light input end side. An input light $L_{IN}$ supplied to the input port IN is input via an optical isolator 14A and the WDM coupler 13, to the erbium-doped fiber 11 which is forwardly pumped by the pumping light $L_p$, and the light which has been propagated through the erbium-doped fiber 11 to be amplified, is sent to the output port OUT via an optical isolator 14B.

Further, the present optical amplifier 1 is provided with a beam splitter (BS) 15A between the input port IN and the optical isolator 14A, and a beam splitter (BS) 15B between the optical isolator 14B and the output port OUT, and a part of the light to be input to the erbium-doped fiber 11 is split by the beam splitter 15A as a monitor light and a part of the light output from the erbium-doped fiber 11 is split by the beam splitter 15B as a monitor light. The input monitor light and the output monitor light respectively split by the beam splitters 15A and 15B are sent to respective photo detectors 16A and 16B, so that the powers thereof are detected by the respective photo detectors 16A and 16B, and signals indicating the respective detection results are output to a control section 17. The control section 17 controls a driving state of the pumping light source 12 based on the output signals from the respective photo detectors 16A and 16B, and a computation result in a computing section 25 (to be described later).

Furthermore, the present optical amplifier 1 is provided with a light source 21, an optical coupler 22, a beam splitter 23, a photo detector 24 and the computing section 25, as a configuration for measuring a threshold of an occurrence of the SBS in a transmission path fiber 2 connected to the output port OUT to calculate an optical input power level capable of preventing an occurrence of a nonlinear optical effect such as the SPM or the like in the transmission path fiber 2.

The light source 21 is a typical light source capable of generating a test light $L_T$ corresponding to a wavelength band of the input light $L_{IN}$. The activating and stopping of this light source 21 are controlled in accordance with a signal output from the computing section 25. The test light $L_T$ output from the light source 21 is supplied onto the optical path between the input/output ports via the optical coupler 22 arranged been the input port IN and the beam splitter 15A, to pass through the erbium-doped fiber 11 so that the power thereof is adjusted, and thereafter, is output to the transmission path fiber 2 from the output port OUT. In the transmission path fiber 2, when the test light $L_T$ of the power exceeding a threshold (to be described later) is output from the optical amplifier 1, a SBS light $L_{SBS}$ which is propagated in an opposite direction to a propagating direction of the test light $L_T$ is generated, and is supplied to the output port OUT from the transmission path fiber 2.

The SBS light $L_{SBS}$ supplied to the output port OUT is extracted by the beam splitter 23 inserted between the output port OUT and the beam splitter 15B, to be sent to the photo detector 24. In the photo detector 24, the power of the SBS light $L_{SBS}$ is detected and a signal indicating the detection result is output to the computing section 25. In the computing section 25, the threshold of the SBS occurrence in the transmission path fiber 2 is obtained according to the output signal from the photo detector 24, and the optical input power level capable of preventing the occurrence of the nonlinear optical effect such as the SPM or the like in the transmission path fiber 2 is computed, and further, a signal indicating the computation result is output from the computing section 25 to the control section 17.

Here, the principle of computation process in the above computing section 25 will be described.

Figure 2:
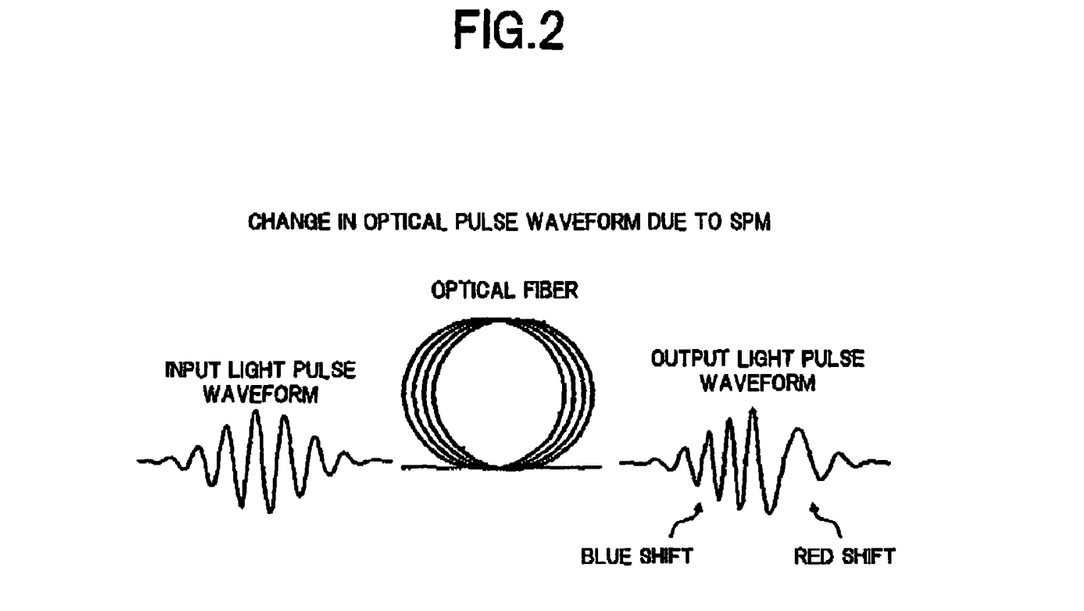
FIG. 2 is a diagram showing a waveform change in an optical pulse due to the SPM.

FIG. 2 shows a waveform change of an optical pulse by the SPM. The optical pulse is subjected to the so-called frequency chirping, such that a frequency variation is increased as a change in the optical intensity is larger and as a transmission distance is longer. As specifically shown in the right side of FIG. 2, in a leading portion of an output light pulse, the frequency chirping is negative which is called the red shift, while in a trailing portion of the output light pulse, the frequency chirping is positive which is called the blue shift. Due to the frequency chirping caused by the SPM during the light is propagated through the optical fiber, a transmission speed of the light is decreased in the leading portion of the optical pulse, but the transmission speed of the light is adversely increased in the trailing portion so that the optical pulse is compressed. In the SPM, a phase is changed so that an optical spectrum is spread, and therefore, optical transmission characteristics are largely influenced by the interaction of the SPM with the chromatic dispersion. A phase change amount $\phi_{NL}^{SPM}$ in the SPM is represented as a function using an optical wavelength $\lambda$, the effective fiber length $L_{eff}$, an effective core cross sectional area $A_{eff}$, the nonlinear refractive index $n_2$ and the input light power P, as shown in the above formula (6).

Figure 3:
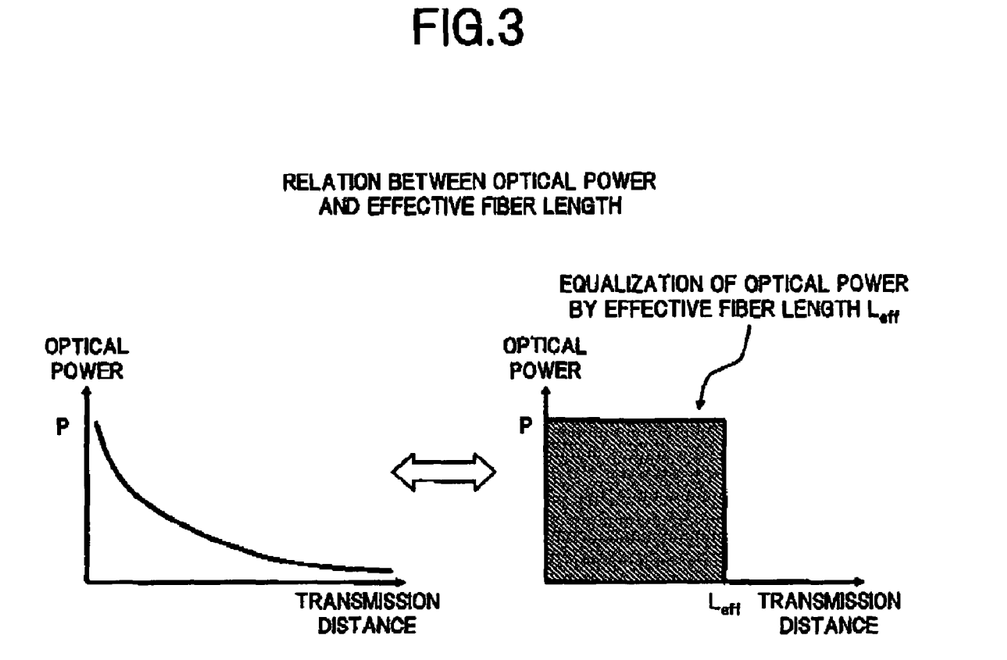
FIG. 3 is a graph for explaining a relation between the input light power and the effective fiber length.

As a scale typically representing the efficiency of nonlinear optical effect, a product of the input light power P and the effective fiber length $L_{eff}$ is used. The effective fiber length $L_{eff}$ is a parameter considering a loss in the optical fiber as shown in the above formula (4), which enables the equalization of the optical power by the effective fiber length $L_{eff}$ as shown in the right side of FIG. 3 for a relation between the transmission distance and the optical power as shown in the left side of FIG. 3. The above product of the input light power P and the effective fiber length $L_{eff}$ corresponds to an area of shaded portion on the right side of FIG. 3.

Figure 4:
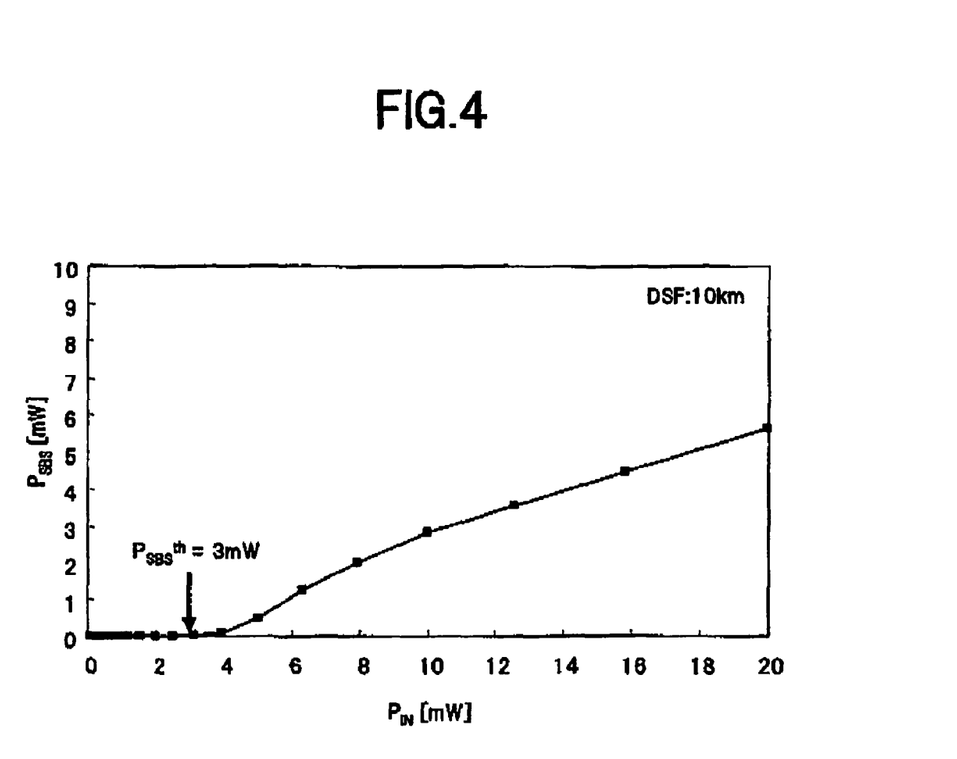
FIG. 4 is a graph showing one example in which a relation of the SBS light power to the input light power to a DSF is measured.

On the other hand, the stimulated Brillouin scattering (SBS) is a nonlinear optical phenomenon in which a light is scattered in an opposite direction to the optical input to the optical fiber, and it is known that the scattered light is abruptly increased at a certain optical input power level as a threshold. For example, FIG. 4 shows one example in which a relation between the optical power $P_{IN}$ input to a dispersion-shifted fiber (DSF) of 10 km and the generated SBS light power $P_{SBS}$ is measured. In this measurement example of FIG. 4, the threshold of the SBS occurrence is approximately 3 mW.

Figure 5:
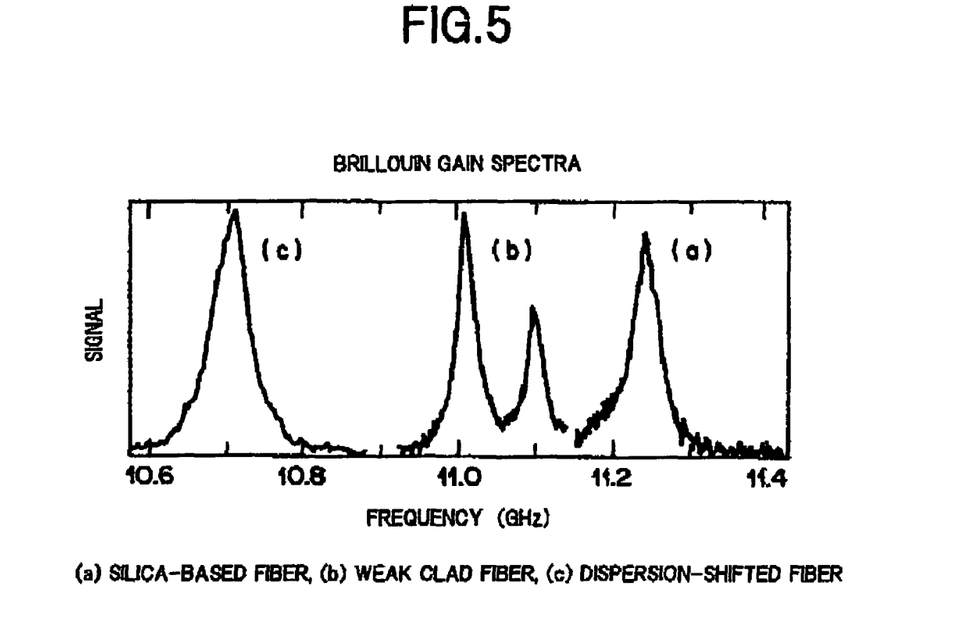
FIG. 5 is a graph showing examples of Brillouin gain spectra in optical fibers of various types.

The above threshold of the SBS occurrence is represented as a function using the effective fiber length $L_{eff}$, the effective core cross sectional area $A_{eff}$, a Brillouin gain coefficient $g_B$, the line width $\Delta v_b$ of the light source and the Brillouin gain line width $\Delta v_b$ as shown in the above formula (11). FIG. 5 shows examples of Brillouin gain spectra, in which (a) corresponds to a silica-based core fiber, (b) corresponds to a weak clad fiber, and (c) corresponds to the dispersion-shifted fiber (for details, refer to the literatur; by R. W. Tkach, A R. Chraplyvy, and R. M. Derosier, Electron. Lett. 22, 1011 (1986)).

If the threshold of the SBS occurrence in the measurement example of the DSF shown in FIG. 4 is calculated in accordance with the above formula (11), 2.7 mW is obtained, and this value is exactly coincident with an experiment value. Incidentally, in the above calculation, there are used $A_{eff}$=46.5 $\mu m^2$ (MFD=7.7 $\mu m$), $L_{eff}$=7846 m (L=10000 m, $\alpha$=5.1×10$^{-5}$/m), $g_B$=5×10$^{-11}$ m/W, $\Delta v_b$=100 MHz and $\Delta v_s$=1 MHz.

If (Aeff/Leff) is eliminated from the above formulas (6) and (11), the SPM phase change amount $\phi_{NL}^{SPM}$ is expressed by the following formula (12) using the SBS occurrence threshold $P_{SBS}^{th}$.

$$\phi_{NL}^{SPM} = \frac{2\pi}{\lambda} \cdot \frac{1}{g_B P_{SBS}^{th}} \cdot \frac{\Delta v_b + \Delta v_s}{\Delta v_b} n_2 P \quad (12)$$

By measuring the SBS occurrence threshold $P_{SBS}^{th}$ based on the above formula (12), the SPM phase change amount $\phi_{NL}^{SPM}$ can be calculated. Further, if an allowable value of the SPM phase change amount which does not substantially influence on the optical transmission characteristics, it becomes also possible to restrict the power P of the light input to the optical fiber.

Further, a phase change amount $\phi_{NL}^{XPM}$ due to the cross phase modulation (XPM) is represented as a function using the optical wavelength $\lambda_1$, the effective fiber length $L_{eff}$, the effective core cross sectional area $A_{eff}$, the nonlinear refractive index $n_2$, a coefficient b and the input light power $P_2$, as shown in the above formula (8). If (Aeff/Leff) is eliminated from the above formulas (8) and (11), the XPM phase change amount $\phi_{NL}^{XPM}$ is expressed by the following formula (13) using the SBS occurrence threshold $P_{SBS}^{th}$.

$$\phi_{NL}^{XPM} = \frac{4\pi}{\lambda_1} \cdot \frac{1}{g_B P_{SBS}^{th}} \cdot \frac{\Delta v_b + \Delta v_s}{\Delta v_b} n_2 b P_2 \quad (13)$$

Accordingly, similarly to the above case for the SPM, by measuring the SBS occurrence threshold $P_{SBS}^{th}$ based on the above formula (13), the XPM phase change amount $\phi_{NL}^{XPM}$ can be calculated. Further, if an allowable value of the XPM phase change amount which does not substantially influence on the optical transmission characteristics, it becomes also possible to restrict the power P of the light input to the optical fiber.

Furthermore, for the stimulated Raman scattering (SRS), it is typically known that a Raman amplification gain factor $G_A$ is expressed by the following formula (14), provided that the pumping light power on the input end of the optical fiber is $P_0$.

$$G_A = \exp\left(g_R P_0 \frac{L_{\mathit{eff}}}{A_{\mathit{eff}}}\right) \quad (14)$$

Since the above formula (14) includes $(L_{\mathit{eff}}/A_{\mathit{eff}})$ therein, by using the above formula (11), the Raman amplification gain factor $G_A$ can be expressed by the following formula (15) using the SBS occurrence threshold $P_{SBS}^{th}$.

$$G_A = \exp\left(g_R P_0 \cdot \frac{1}{g_B P_{SBS}^{th}} \cdot \frac{\Delta v_b + \Delta v_s}{\Delta v_b}\right) \quad (15)$$

Incidentally, as described before, the SRS occurrence threshold $P_{SRS}^{th}$ is larger than the SBS occurrence threshold $P_{SBS}^{th}$ by two digits and accordingly, at a signal level in the optical transmission system, there is a relatively low possibility that the SRS affects the optical transmission characteristics. However, in the optical transmission system to which the distributed Raman amplification utilizing the transmission path is applied, it is effective that, by measuring the SBS light, the parameter $(L_{\mathit{eff}}/A_{\mathit{eff}})$ of the actually used transmission path fiber is judged, to thereby obtain a relation been the Raman amplification gain factor $G_A$ and the pumping light power $P_0$ (corresponding to the input light power to the transmission path fiber).

In accordance with the above principle of computation process, in the optical amplifier 1 shown in FIG. 1, by activating the light source 21 before the operation start, the test light $L_T$ for measuring the SBS occurrence threshold in the transmission path fiber 2 is generated. The test light $L_T$ is sent to the erbium-doped fiber 11 via the optical coupler 22, and the supply power of the pumping light $L_P$ to the erbium-doped fiber 11 is adjusted, so that the power of the test light $L_T$ to be output from the output port OUT to the transmission path fiber 2 is continuously changed. Then, a generation state of the SBS light $L_{SBS}$ corresponding to the power of the test light $L_T$ in the transmission path fiber 2 is monitored by the beam splitter 23 and the photo detector 24, and the monitoring results are transmitted to the computing section 25. Note, the operation of the light source 21 is stopped when the monitoring of the SBS light $L_{SBS}$ has been normally finished.

In the computing section 25, the SBS occurrence threshold $P_{SBS}^{th}$ in the transmission path fiber 2 is obtained based on the monitored change in the power of the SBS light $L_{SBS}$, and then, using the threshold $P_{SBS}^{th}$ obtained by the measurement and the allowable value of the phase change amount due to the SPM or the like, which does not substantially influence on the optical transmission characteristics, a value of the input light power P to the transmission path fiber 2, namely, an upper limit value of the optical output power of the optical amplifier 1, is computed based on the relation in the above formula (12) or the like. Further, the computation result is transmitted to the control section 17, to be reflected on a control of a gain or an optical output power level of the optical amplifier 1 at the operation time. As a result, it becomes possible to avoid the degradation of the optical transmission characteristics due to the SPM or the like.

As described in the above, the measuring method of the nonlinear optical properties such as the SPM or the like based on the monitoring of the SBS light, which is used in the present optical amplifier 1, does not need a significantly complicated measuring system differently from a conventional measuring method, and therefore, it is possible to accurately measure, with a simple configuration, the nonlinear optical properties of the transmission path fiber 2 connected to the output port of the optical amplifier 1. Further, by reflecting the measurement result on the control of the gain or the optical output power level of the optical amplifier, it becomes possible to effectively suppress the optical S/N ratio degradation due to the nonlinear optical effect.

Next, there will be described an embodiment of the optical transmission system utilizing the optical amplifier 1 as described in the above.

Figure 6:
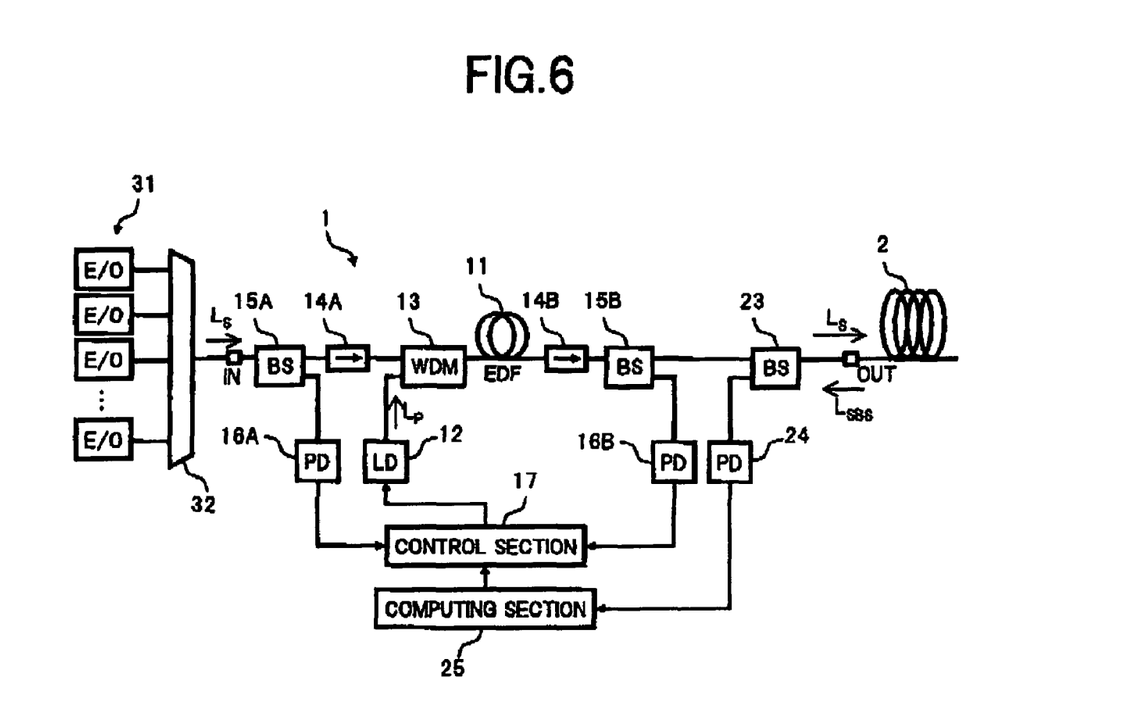
FIG. 6 is a block diagram showing a configuration of one embodiment of an optical transmission system according to the present invention.

FIG. 6 is a block diagram showing a configuration of the embodiment of the optical transmission system according to the present invention.

In FIG. 6, in the present optical transmission system, the optical amplifier 1 shown in FIG. 1 is applied as a post-amplifier in a typical WDM optical transmission system as shown in FIG. 7. However, herein, as the test light $L_T$ for generating the SBS light $L_{SBS}$, a WDM light $L_S$ output from a plurality of electro-optical converters (E/O) 31 to be multiplexed in a wavelength multiplexer 32, is used, so that the light source 21 and the optical coupler 22 can be omitted. Incidentally, in order to generate the SBS light $L_{SBS}$ in the transmission path fiber 2 connected to the output port OUT of the optical amplifier 1 by utilizing the WDM light $L_S$ to be input to the input port IN of the optical amplifier 1 from the wavelength multiplexer 32, the power of about several ten mW is needed as the power per one wavelength of the WDM light $L_S$ output from the optical amplifier 1. Such the output light power can be sufficiently realized by a typical EDFA having a feature of high output power characteristics.

In the optical transmission system of the above described configuration, each of the electro-optical converters 31 is activated at the time of system starting up, and a continuous light or an appropriately patterned light output from each of the electro-optical converters 31 is multiplexed in the wavelength multiplexer 32, so that the WDM light $L_S$ is supplied to the input port IN of the optical amplifier 1. In the optical amplifier 1, the input WDM light $L_S$ is sent to the erbium-doped fiber 11, and the supply power of the pumping light $L_P$ to the erbium-doped fiber 11 is adjusted so that the power of the WDM light $L_S$ to be output from the output port OUT to the transmission path fiber 2 is continuously changed. Then, the generation state of the SBS light $L_{SBS}$ corresponding to the power of the WDM light $L_S$ in the transmission path fiber 2 is monitored by the beam splitter 23 and the photo detector 24.

The monitoring results are transmitted to the computing section 25, so that the SBS occurrence threshold $P_{SBS}^{th}$ in the transmission path fiber 2 is obtained, similarly to the above. The upper limit value of the optical output power of the optical amplifier 1 is computed based on the obtained threshold, and the computation result is reflected on the control of the gain or the optical output power level of the optical amplifier 1 at the operation time after the system starting up. As a result, it becomes possible to avoid the degradation of the optical transmission characteristics due to the SPM or the like.

Note, in the embodiment of the optical transmission system, there has been shown the configuration example in which the optical amplifier according to the present invention is used as the post-amplifier at the transmission end. However, the present invention is not limited thereto, and the optical amplifier according to the present invention can be applied as, for example, an optical amplifier in an optical repeater or a pre-amplifier on a reception end.

Further, in each of Me embodiments of the optical amplifier and the optical transmission system, there has been described the case where the transmission path fiber 2 is connected to the output port OUT of the optical amplifier 1. However, the same function and effect can also be obtained in the case where a dispersion-compensating fiber is connected to the output port, like the former-staged optical amplifier 121B in the pre-amplifier shown in the above described FIG. 7, for example. Furthermore, there has been shown the one example of the optical amplifier utilizing the erbium-doped fiber. However, the present invention is also effective for a known optical amplifier, such as, an optical fiber amplifier doped with a rare-earth element other than erbium, a semiconductor optical amplifier, an optical fiber Raman amplifier or the like.

What is claimed is:

1. An optical amplifier provided with: an input port to which an optical signal is input; an output port to which an optical fiber is connected; an optical amplifying section disposed on an optical path between said input port and said output port; and a control section that controls said optical amplifying section, comprising:
    a test light supply section configured to supply, to said optical amplifying section, a test light corresponding to a wavelength of the optical signal input to said input port;
    an optical power measuring section configured to supply said test light amplified by said optical amplifying section to one end of said optical fiber from said output port, and configured to measure a power of a light which is input to said output port from the one end of said optical fiber and propagated in a direction opposite to that of said input light, to judge whether or not stimulated Brillouin scattering occurs; and
    a computing section configured to obtain a threshold of the input light power, at which the stimulated Brillouin scattering occurs in said optical fiber, based on the input light power and the judgment result in said optical power measuring section, and configured to obtain a relation between the input light power and an occurrence amount of a nonlinear optical effect which is different from the stimulated Brillouin scattering in said optical fiber, using said threshold,
    wherein said control section is configured to control an amplifying operation of the optical signal in said optical amplifying section, based on the relation obtained by said computing section, to suppress an occurrence of the nonlinear optical effect in said optical fiber.

2. An optical amplifier according to claim 1,
    wherein said computing section is configured to compute an upper limit value of the input light power to said optical fiber, using said threshold and an allowable value of a phase change amount due to a self phase modulation, which allowable value does not substantially influence optical transmission characteristics, and
    said control section is configured to control a gain of said optical amplifying section, so that the optical signal of the power equal to or less than the upper limit value computed by said computing section is output from said output port.

3. An optical amplifier according to claim 1,
    wherein said computing section is configured to compute an upper limit value of the input light power to said optical fiber, using said threshold and an allowable value of a phase change amount due to a cross phase modulation, which allowable value does not substantially influence optical transmission characteristics, and said control section is configured to control a gain of said optical amplifying section, so that the optical signal of the power equal to or less than the upper limit value computed by said computing section is output from said output port.

4. An optical amplifier according to claim 1,
    wherein said output port is connected to one end of a transmission path fiber.

5. An optical amplifier according to claim 1,
    wherein said output port is connected to one end of a dispersion-compensating fiber.

6. An optical transmission system which transmits/receives an optical signal via a transmission path fiber,
    wherein an optical amplifier recited in claim 1 is arranged on said transmission path fiber.

7. An optical amplifier provided with: an input port to which an optical signal is input; an output port to which an optical fiber is connected; an optical amplifying section disposed on an optical path between said input port and said output port; and a control section that controls said optical amplifying section, comprising:
    an optical power measuring section configured to supply, as an input light, an optical signal input to said input port to be amplified by said optical amplifying section to one end of said optical fiber from said output port, and configured to measure a power of a light which is input to said output port from the one end of said optical fiber and propagated in a direction opposite to that of said input light, to judge whether or not stimulated Brillouin scattering occurs; and
    a computing section configured to obtain a threshold of the input light power, at which the stimulated Brillouin scattering occurs in said optical fiber, based on said input light power and the judgment result in said optical power measuring section, and configured to obtain a relation between the input light power and an occurrence amount of a nonlinear optical effect which is different from the stimulated Brillouin scattering in said optical fiber, using said threshold,
    wherein said control section is configured to control an amplifying operation of the optical signal in said optical amplifying section based on the relation obtained by said computing section, to suppress an occurrence of the nonlinear optical effect in said optical fiber.

8. An optical amplifier according to claim 7,
    wherein said computing section is configured to compute an upper limit value of the input light power to said optical fiber, using said threshold and an allowable value of a phase change amount due to a self phase modulation, which allowable value does not substantially influence optical transmission characteristics, and said control section is configured to control a gain of said optical amplifying section, so that the optical signal of the power equal to or less than the upper limit value computed by said computing section is output from said output port.

9. An optical amplifier according to claim 7, wherein said computing section is configured to compute an upper limit value of the input light power to said optical fiber, using said threshold and an allowable value of a phase change amount due to a cross phase modulation, which allowable value does not substantially influence optical transmission characteristics, and said control section is configured to control a gain of said optical amplifying section, so that the optical signal of the power equal to or less than the upper limit value computed by said computing section is output from said output port.

10. An optical amplifier according to claim 7, wherein said output port is connected to one end of a transmission path fiber.

11. An optical amplifier according to claim 7, wherein said output port is connected to one end of a dispersion-compensating fiber.

12. An optical transmission system which transmits/receives an optical signal via a transmission path fiber, wherein an optical amplifier recited in claim 7 is arranged on said transmission path fiber.

* * * * *